United States Patent

Slockett

[15] 3,686,276

[45] Aug. 22, 1972

[54] PURIFICATION PROCESS FOR DIMETHYL TEREPHTHALATE

[72] Inventor: Robert Donald Slockett, Woodbury Heights, N.J.

[73] Assignee: E. I. du Pont de Nemours and Company, Wilmington, Del.

[22] Filed: June 2, 1969

[21] Appl. No.: 829,806

[52] U.S. Cl. ............................................. 260/475 B
[51] Int. Cl. ............................................. C07c 69/82
[58] Field of Search .......................... 260/475, 475 R

[56] References Cited

UNITED STATES PATENTS

| | | | |
|---|---|---|---|
| 2,894,978 | 7/1959 | Katzschmann | 260/475 |
| 3,513,193 | 5/1970 | Katzschmann | 260/525 |

*Primary Examiner*—Lorraine A. Weinberger
*Assistant Examiner*—E. Jane Skelly
*Attorney*—Lawton A. Burrows, Jr.

[57] ABSTRACT

Crude dimethyl terephthalate is purified by crystallizing dimethyl terephthalate from a solution of the crude dimethyl terephthalate in methyl p-toluate followed by separating the dimethyl terephthalate from the methyl p-toluate solution.

11 Claims, No Drawings

PURIFICATION PROCESS FOR DIMETHYL TEREPHTHALATE

BACKGROUND OF THE INVENTION

This invention relates to a process for the purification of dimethyl terephthalate. As used herein, all parts and percentages are by weight unless otherwise indicated.

Dimethyl terephthalate is conventionally made by the acid-catalyzed reaction of methanol with terephthalic acid at elevated temperatures. The terephthalic acid used in the process can be prepared by the oxidation of p-xylene with air, nitric acid or with a combination of air and nitric acid. The terephthalic acid made by such oxidation processes usually contains varying amounts of impurities which are carried over into the esterification reaction and contaminate the product dimethyl terephthalate. Such impurities must be removed from the dimethyl terephthalate before it can be converted into polyethylene terephthalate of satisfactory quality for commercial usage in synthetic fibers and film.

To this end, dimethyl terephthalate is often purified by crystallization from commercial solvents, especially xylol (a hydrocarbon mixture of xylene isomers and ethylbenzene), and dimethyl terephthalate of relatively high purity can be obtained, but not without some sacrifice in the yield of purified ester. In such crystallization processes, generally a small portion of the crystallization solvent filtrate is removed or purged from the system and fresh solvent added in order to prevent build-up of impurities and to maintain the entire system at a constant solvent volume. However, this purge stream also carries along with it about from 5 to 8 percent dimethyl terephthalate as well as a large amount of solvent. In order to recover the purged solvent and the dimethyl terephthalate, this purged filtrate is sent to a purge recovery system where it is passed through a distillation or solvent recovery column in order to recover the solvent, and the residue remaining in the column is crystallized from one of the aforementioned solvents and filtered to recover some of the dimethyl terephthalate content. The remaining filtrate is stripped of solvent and the heels or bottoms, which still contain a large amount of dimethyl terephthalate, i.e., from about 20 to 30 percent, are normally discarded as yield loss, as the present purification methods are not adequate for economical recovery of this dimethyl terephthalate. Thus, there is needed an improved purification process for dimethyl terephthalate.

SUMMARY OF THE INVENTION

In accordance with this invention there is provided a simple and economical process for purifying crude dimethyl terephthalate. More specifically, there is provided a process for purifying crude dimethyl terephthalate, comprising crystallizing dimethyl terephthalate from a solution of crude dimethyl terephthalate in methyl p-toluate, followed by separating the dimethyl terephthalate from the methyl p-toluate solution. The process of this invention finds special utility in reclaiming dimethyl terephthalate in high yield from the purge solvent recovery column heels or bottoms of present commercial purification methods.

DESCRIPTION OF PREFERRED EMBODIMENTS

This invention is based on the discovery that methyl p-toluate has an excellent solvent capacity for the major impurities that are present in crude dimethyl terephthalate relative to its solvent capacity for the dimethyl terephthalate. The excellent recovery of dimethyl terephthalate from this solvent medium is attributed to the absence of a synergistic solubility effect, i.e., increased solubility of the dimethyl terephthalate due to the presence of impurities, which is often observed with dimethyl terephthalate in other solvent systems, e.g., xylol. Comparative solubility determinations of the major dimethyl terephthalate impurities, i.e., 3,5-dicarbomethoxy phenyl-1,2,4-oxadiazole, 2,6-dicarbomethoxyfluorenone, p-carbomethoxy benzyl p-carbomethoxybenzoate, methyl p-nitrobenzoate, methyl p-formylbenzoate and methyl p-cyanobenzoate, show that they are all more soluble in methyl p-toluate than in xylol. Dimethyl terephthalate is also more soluble in methyl p-toluate than in xylol; however, the solubility ratio of these impurities to dimethyl terephthalate is greater in methyl p-toluate than in xylol.

The initial step in carrying out the process of this invention is forming a solution of the crude dimethyl terephthalate in methyl p-toluate. Since it is preferred that sufficient solvent be present to keep the dimethyl terephthalate in solution above about 80°–85°C in order to insure adequate fluidity of the cooled and crystallized dimethyl terephthalate, a molar ratio of methyl p-toluate/dimethyl terephthalate of from about 1/1 to 5/1 is preferred, with 2/1 to 3/1 being especially preferred.

In crystallizing the dimethyl terephthalate from the methyl p-toluate, any of the well-known crystallization techniques can be employed. Slow cooling of the solution from about 90° to about 20° to 45°C, at a rate of approximately 0.4° to 5°C/minute by cooling water supplied through coils is preferred for growing the purest crystals. However, for reasons of economy and in order to minimize retention times, the commercially preferred techniques of vacuum or atmospheric crystallization with cooling by water injection and evaporation or by internal cooling coils are preferred.

In a preferred embodiment of this invention, one or more vacuum crystallizations is carried out in a batch or continuous manner. Batch vacuum crystallization of the dimethyl terephthalate is advantageously carried out at about from 200 to 10 mm Hg with injection of about from 0.5 to three parts of water per part of dimethyl terephthalate to cool the crystallizer contents from about 90° to about 20°–45°C in approximately 30 to 45 minutes to a readily filterable slurry. For continuous vacuum crystallization, i.e., cooling by water injection from about 90° to about 20° to 45°C, and preferably at 200 to 10 mm Hg, the solution of dimethyl terephthalate in methyl p-toluate and cooling water are added continuously to the crystallizer (internal or external cooling by coils or jacketing of the crystallizer are just as satisfactory) and the slurry of dimethyl terephthalate crystals drawn off, at 20°–45°C, continuously into a filter feed tank using retention times of from 30 to 45 minutes.

After crystallization, the dimethyl terephthalate crystals are separated from the solvent by any conventional method, e.g., filtration or centrifugation. Filtration is carried out at a temperature of from about 20° to 45°C, and preferably from about 28° to 35°C. If desired, the thus filtered dimethyl terephthalate crystals are further repulped or slurried at ambient temperature with fresh solvent, washed with additional solvent, and filtered again at about 20°-45°C. The filter cake, wet with methyl p-toluate, can then be distilled or washed with xylol to separate the dimethyl terephthalate from any remaining methyl p-toluate, which is normally about 10 to 20 percent of the filter cake.

The dimethyl terephthalate recovered by the process of this invention is on the order of about 60 to 95 percent pure and represents about a 70 to 95 percent recovery. It can be subjected to further purification, e.g., crystallization and/or distillation, depending upon the desired degree of purity of the final product.

In its preferred embodiment, the process of this invention finds special application in reclaiming dimethyl terephthalate from the normally discarded purge solvent recovery column heels of continuous crystallization-purification systems for dimethyl terephthalate. These systems normally consist of a main dimethyl terephthalate crystallization-purification train and an auxiliary purge recovery system designed to recover dimethyl terephthalate and solvent values purged as filtrate from the main dimethyl terephthalate crystallization-purification train.

The purged filtrate from the main purification train, usually containing about 95 percent solvent, e.g., xylol, and 5 percent dissolved solids, of which about 80 percent is dimethyl terephthalate, is fed continuously to the auxiliary purge recovery system, the last stage of which is normally a purge solvent recovery column. The heels from this purge solvent recovery column, which heretofore have been discarded but which often contain as much as 30 percent dimethyl terephthalate, are then treated according to the process of this invention to recover the dimethyl terephthalate.

The amount of dimethyl terephthalate which can be recovered from these heels depends upon their dimethyl terephthalate content and is controlled by the filtrate purge ratio from the main crystallization-purification stream, this ratio being defined as the ratio of the amount of solvent filtrate purged from the main crystallization-purification stream to the amount recycled to the main dissolver for reuse. Since it is usually necessary to operate at a purge ratio high enough to remove all of the impurities introduced into the refining area by the impure terephthalic acid utilized in the manufacture of the dimethyl terephthalate, there is almost always an excessive amount of dimethyl terephthalate and solvent sent to the purge recovery system. This results in an increased yield loss of unrecovered dimethyl terephthalate in the normally discarded purge solvent recovery column heels, i.e., the more dimethyl terephthalate entering the purge recovery system, the more yield loss encountered at the same percentage recovery by the system.

The composition of the purge solvent recovery column heels will vary considerably depending upon the operation of this oxidation, esterification, crystallization and purge processes involved in manufacturing and purifying the dimethyl terephthalate. For illustrating purposes, Table I below gives typical concentration ranges of various components found in purge solvent recovery column heels.

TABLE I

| Component | Concentration (Weight Percent) |
|---|---|
| Dimethyl Terephthalate | 20–30 |
| Methyl p-Toluate | 25–45 |
| Methyl p-(methyl acetal) Benzoate | 10–25 |
| 2,6-Dicarbomethoxyfluorenone | 0–10 |
| Methyl p-Formylbenzoate | 3–6 |
| Methyl p-Cyanobenzoate | 0–3 |
| Methyl p-Nitrobenzoate | 5–15 |
| Methyl Benzoate | 3–5 |
| 2,5-Dimethyl Phenyl p-Methylbenzoate | 2–3 |
| 2,5,10-Trimethyl Bibenzoate | 1–2 |
| 2,5-Dimethyl Phenyl p-Toluene | 1–2 |
| 3,5-Dicarbomethoxy Phenyl 1,2,4-Oxadizaole | <1 |
| Xylol | 1–3 |
| Water | 1–3 |

As can be seen from the table, methyl p-toluate is a major component of the heels. In the pure state, methyl p-toluate is a solid below about 35°C. However, in the presence of the purge heel impurities, methyl p-toluate is liquid at about 20°C and contributes to the solution of the impurities by both solubility and freezing point depression. For example, pure methyl p-formylbenzoate and methyl p-toluate melt at 62°C and 35°C, respectively, but the melting point of a 30/100 mixture of these compounds is below about 23°C. Furthermore, between about 35°C and 43°C, the solubility of methyl p-formylbenzoate in methyl p-toluate increases from about 93 to about 173 g/100 g.

As a rule, sufficient methyl p-toluate, i.e., from about 25 to 34 percent (Table I), will already be present in the heels to make any further addition unnecessary. However, if additional methyl p-tolutate is required in order to obtain adequate fluidity, a portion of the heels filtrate from a previous cycle can be recycled to the heels.

Generally, the solvent recovery column heels are in either of two physical forms, molten in the heels column discharge or as an intractable solid at temperatures below about 40°C. In the molten state, the heels are crystallized, by cooling from about 260°–240°C down to about 45°–20°C. The crystallization point of the solvent recovery column heels will vary from about 60°–85C, depending upon the quantities of dimethyl terephthalate and methyl p-toluate present in the heels. In order to obtain a fluid slurry for efficient filtration at 20°–45C and for maximum dimethyl terephthalate recovery, a crystallization temperature of around 70° to 80°C is especially desirable. This crystallization point and consistency can be very easily maintained by diluting the solution with filtrate from a previous filtration of the crystallized heels. For example, the addition of one part of filtrate to two parts of heels lowers the crystallization point from 85° to 72°C. This dilution in no way adversely affects the quality of the dimethyl terephthalate crystals recovered from the heels. Alternatively, the molten heels can be passed through a heat exchanger into a crystallizer feed tank, which is maintained at about 90°–100°C. The dimethyl terephthalate is then crystallized in a one-stage vacuum crystallizer, maintained at about from 20° to 45°C by water injection. The dimethyl terephthalate crystals are filtered at 20-45°C.

If the molten heels have been allowed to cool and solidify, redissolution and recrystallization will not be necessary in order to obtain the dimethyl terephthalate. In this case, the heels need only be agitated, e.g., mechanically stirred or air or some other inert gas can be bubbled through the heels, at ambient temperature, to obtain a fluid crystal slurry from which the dimethyl terephthalate can be filtered.

The filtration temperature is not critical with respect to yield of recovered dimethyl terephthalate at about from 20° to 45°C. Above about 45°C, however, there is a rapid increase in dimethyl terephthalate solubility in the heels liquor and a corresponding decrease in yield or recovery of dimethyl terephthalate. On a commercial scale the actual operating temperature of the crystallizer and filter can best be ascertained by equipment performance using yield loss through measurement of the percent dimethyl terephthalate solubility in the discarded filtrate as the criteria.

The dimethyl terephthalate thus reclaimed from the heels can be recycled to the auxiliary purge recovery system and/or to the main purification stream.

Use of the foregoing permits recovery of about 70 to 95 percent of the dimethyl terephthalate contained in the purge solvent recovery column heels, thus significantly reducing the loss of dimethyl terephthalate and allowing for an increased overall yield of dimethyl terephthalate.

It is to be understood that while the recovery of dimethyl terephthalate from purge solvent recovery column heels is an important application of the process of this invention, this invention is not limited to such application, as any impure dimethyl terephthalate can be purified and recovered according to the process of this invention.

The following examples further illustrate the process of this invention. In the examples, parts and percentages reported are by weight.

EXAMPLE I

Four hundred parts of crude dimethyl terephthalate, prepared by the sulfuric acid-catalyzed esterification of terephthalic acid which is produced by nitric acid oxidation of p-xylene, and containing eight parts nitrocompounds and four parts aldehydes, are fed together with 950 parts methyl p-toluate into a dissolver-crystallizer. The dissolver-crystallizer is a closed tank provided with an agitator, vented condenser and heating coils for maintaining the temperature at about 80°C, i.e., above the crystallization temperature or the freezing point of the dimethyl terephthalate in the methyl p-toluate solution. The resulting solution is crystallized under 20 mm Hg to a filterable slurry while maintaining the temperature at about 30°C by water injection. This slurry is filtered on a rotary vacuum filter at 30°C. The filter cake is subsequently washed with 200 parts of fresh methyl p-toluate at 30°C. The filter cake which contains 350 parts dimethyl terephthalate and 350 parts methyl p-toluate is repulped at 30°C with 550 parts added methyl p-toluate and filtered again at 30°C. Two hundred parts of fresh methyl p-toluate are employed to wash the filter cake at 30°C. The filter cake is distilled at 286°-290°C at atmospheric pressure to give 300 parts of purified dimethyl terephthalate (77 percent recovery). Analysis of the product by polarography showed that it contained 28 ppm nitrocompounds and 86 ppm aldehydes.

EXAMPLE II

This example illustrates the effectiveness of this invention for recovering dimethyl terephthalate in high yield from normally discarded purge xylol recovery column heels. The heels are obtained as a result of purging xylol filtrate from the main crystallization-purification area. This filtrate is fed to an auxiliary primary purge recovery system consisting, in series, of a xylol recovery column, purge dissolver, purge crystallizer, and purge filter. In the xylol recovery column some of the xylol is recovered by distillation. Fifteen hundred parts of the remaining residue containing about 40 percent solids of which 75 percent is dimethyl terephthalate are subsequently worked up by crystallization from fresh xylol, filtration, and the dimethyl terephthalate recovered on the purge filter as a primary purge cake. Part of the filtrate from the purge filter goes back to the purge dissolver and the remaining filtrate composed of approximately 90 percent xylol, the remainder being solids of which 20 percent is dimethyl terephthalate, is passed into a purge xylol recovery column operated at atmospheric pressure and maintained at a temperature of 240° to 260°C. Here the xylol is distilled and recovered overhead and 704 parts of molten heels having the composition shown in Table II remain in the bottom of the column.

TABLE II

| Component | Primary Purge Xylol Recovery Column Heels (By Weight) |
|---|---|
| 1. Methyl p-Toluate | 40% |
| 2. Methyl p-Nitrobenzoate | 10% |
| 3. Methyl p-Formylbenzoate | 1% |
| 4. Oxadiazole | 0.5% |
| 5. 2,6-Dicarbomethoxyfluorenone | 100 ppm |
| 6. Methyl p-Cyanobenzoate | 1% |
| 7. Methyl p-(Methylacetal)benzoate | 20% |
| 8. Dimethyl Terephthalate | 20% |
| 9. Other impurities | 7% |

The molten heels are passed through a heat exchanger into a crystallizer feed tank which is a closed tank provided with an agitator, vented condenser and heating coils which maintain the temperature at about 90°C. From the crystallizer feed tank the liquid heels, i.e., the solution of dimethyl terephthalate plus impurities in methyl p-toluate, are passed into a one-stage vacuum crystallizer where the solution is cooled to 30°C by means of water injection. At this temperature the dimethyl terephthalate crystallizes out of solution, and the resulting slurry is passed onto a rotary vacuum filter where the dimethyl terephthalate crystals are filtered at 30°C. The wet filter cake contains 106 parts dimethyl terephthalate. This represents a recovery of 76 percent of the dimethyl terephthalate normally discarded in the heels. The wet dimethyl terephthalate cake recovered can be distilled as in Example 1 or can be redissolved in xylol and reworked through the primary purge system and recovered along with the primary purge cake. This combined primary-secondary purge cake can then be recycled through the main purification-crystallization system if so desired.

EXAMPLE III

One thousand parts of solid purge xylol recovery column heels (normally burned as waste) containing 265 parts of dimethyl terephthalate, 419 parts of methyl p-toluate and 316 parts impurities are fluidized by agitation and filtered, at 30°C, on a buchner funnel. The filter cake is not washed with any solvent. The recovered wet cake weighs 309 parts and contains 228 parts of dimethyl terephthalate (86 percent recovery).

EXAMPLE IV

Example 3 is repeated, only the wet filter cake is washed with 500 parts of 10° xylol. After air drying, the recovered cake obtained weighs 263 parts. The net dimethyl terephthalate recovery is 240 parts (90 percent recovery).

What is claimed is:

1. A process for the purification of crude dimethyl terephthalate which is obtained from the esterification of terephthalic acid comprising crystallizing dimethyl terephthalate from a solution of said crude dimethyl terephthalate in a solvent consisting essentially of methyl p-toluate followed by separation of the crystallized dimethyl terephthalate from the methyl p-toluate solution.

2. A process of claim 1 wherein the molar ratio of methyl p-toluate to dimethyl terephthalate is about from 1 to 1 to 5 to 1.

3. A process of claim 2 wherein said separation comprises filtration at about from 20° to 45°C.

4. A process of claim 3 wherein said molar ratio is about from 2 to 1 to 3 to 1 and said filtration is at about from 28° to 35°C.

5. A process of claim 3 wherein said separation further comprises distilling off and collecting the purified dimethyl terephthalate.

6. A process of claim 3 wherein said crystallization is carried out by cooling the solution to about from 20° to 45°C.

7. A process of claim 6 wherein said cooling is at a rate of from about 0.4° to 5°C per minute.

8. A process of claim 6 wherein said crystallization is carried out at a pressure of about from 200 to 10 mm Hg.

9. In a process for the purification of dimethyl terephthalate which is obtained from the esterification of terephthalic acid wherein dimethyl terephthalate is dissolved in xylol and less than all of the dissolved terephthalate is recovered by crystallization from said xylol and the xylol is subsequently distilled to yield heels comprising impure dimethyl terephthalate and methyl p-toluate; the improvement which comprises recovering the impure terephthalate from said heels by crystallization followed by separation of the crystallized dimethyl terephthalate.

10. A process of claim 9 wherein said heels are solid, said heels are agitated before said separation and said separation comprises filtration at about from 20° to 45°C.

11. A process of claim 9 wherein said crystallization is carried out by cooling the heels to about from 20° to 45°.

* * * * *